Figure 1:
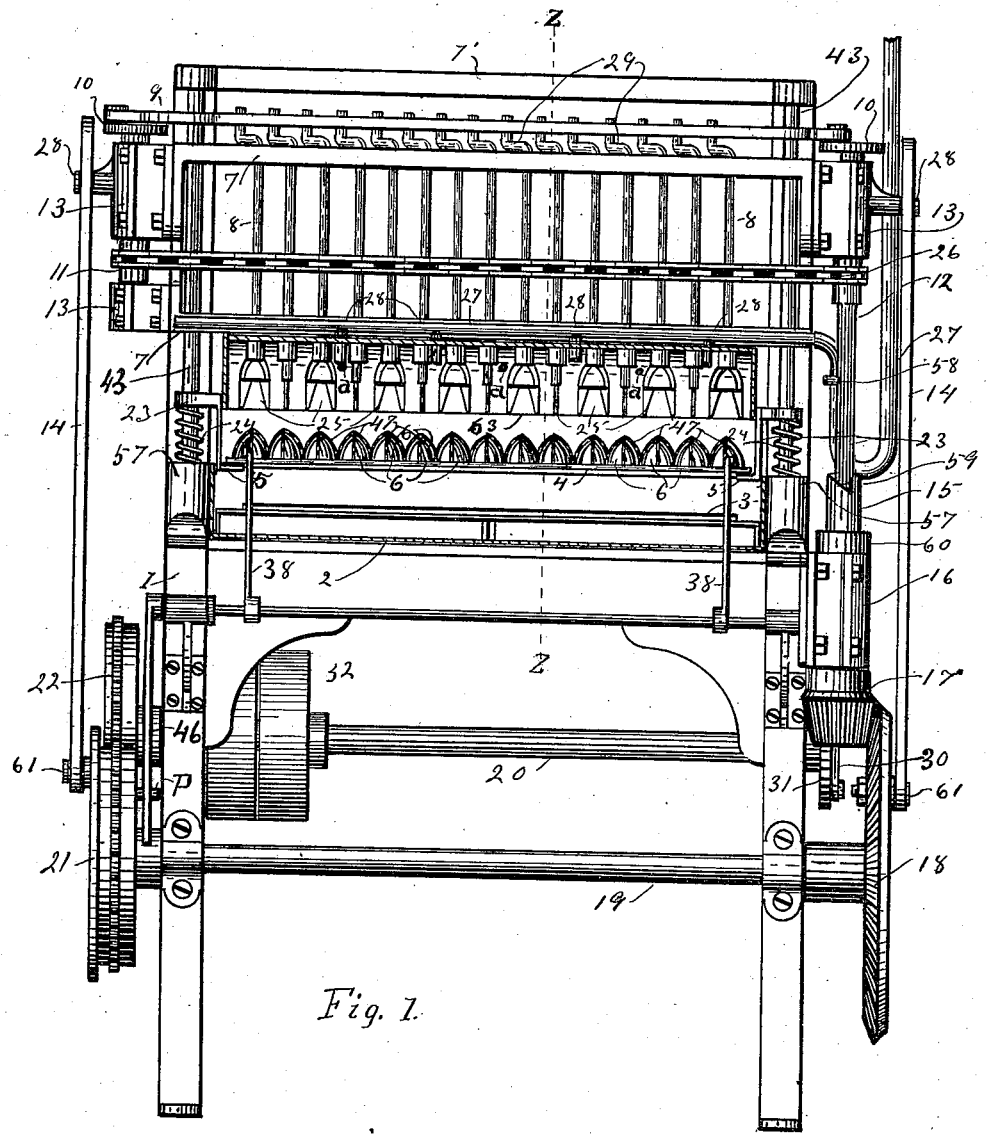

(No Model.)
3 Sheets—Sheet 1.

P. J. VANDER LINDA.
CHOCOLATE COATING MACHINE.

No. 577,566. Patented Feb. 23, 1897.

Witnesses:
F. L. Stewart
M. K. Jones

Inventor.
Peter J. VanderLinda
By Ithiel J. Cilley
Attorney.

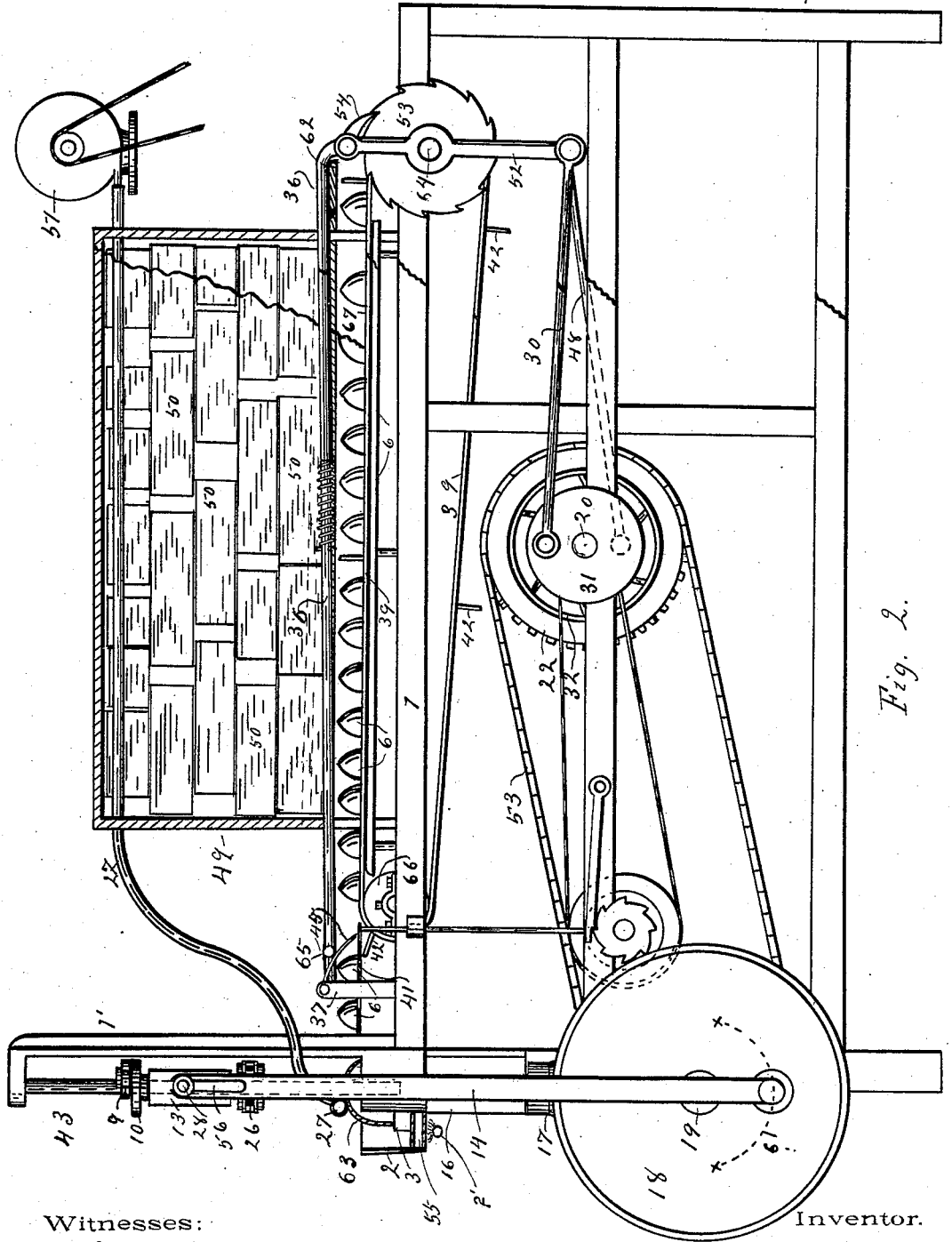

(No Model.) 3 Sheets—Sheet 3.
P. J. VANDER LINDA.
CHOCOLATE COATING MACHINE.
No. 577,566. Patented Feb. 23, 1897.
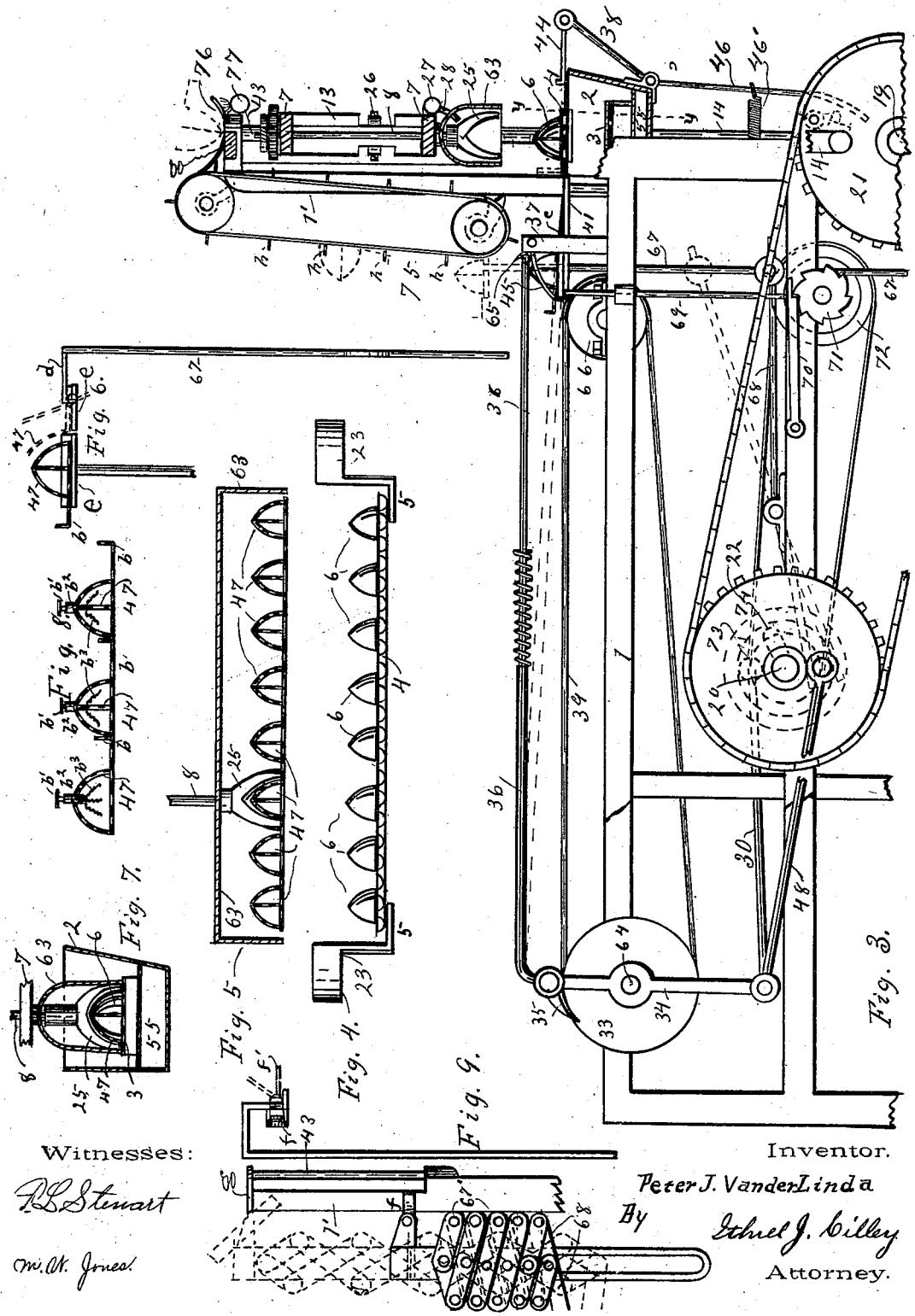
Witnesses:
P. L. Stewart
M. N. Jones
Inventor.
Peter J. Vander Linda
By Ithuel J. Cilley
Attorney.
THE NORRIS PETERS CO., PHOTO-LITHO., WASHINGTON, D. C.

UNITED STATES PATENT OFFICE.

PETER J. VANDER LINDA, OF GRAND RAPIDS, MICHIGAN.

CHOCOLATE-COATING MACHINE.

SPECIFICATION forming part of Letters Patent No. 577,566, dated February 23, 1897.

Application filed December 16, 1895. Serial No. 572,356. (No model.)

*To all whom it may concern:*

Be it known that I, PETER J. VANDER LINDA, a citizen of the United States, residing at Grand Rapids, in the county of Kent and State of Michigan, have invented certain new and useful Improvements in Chocolate-Coating Machines, of which the following is a specification.

My invention relates to improvements in machines for coating heated chocolate upon candy centers; and its objects are, first, to provide for governing the color of the chocolate on the coated centers by isolating the centers from the body of the chocolate and intermingling a current of cold air with the chocolate as it is being coated upon the centers; second, to automatically govern the thickness of the coat of chocolate upon the centers, and, third, to provide for removing the guards from over the centers as they leave the dipping-trough. I attain these objects by the mechanism illustrated in the accompanying drawings, in which—

Figure 1 is an end elevation of the machine with the dipping-trough in section on the line $y\, y$ of Fig. 3, and showing the construction of and the manner of operating the coating-brushes. Fig. 2 is a side elevation of the machine with an ice-box in position and showing the relative position of the several parts. Fig. 3 is a reverse view of the same with ice-box removed and the brush-frame and dipping-trough in section on the line $z\, z$ of Fig. 1. Fig. 4 is a detached elevation of the dipping-tray and supports with stock on the tray in position to be acted upon by the coating-brushes. Fig. 5 is a sectional elevation of the hood that covers the stock and the wire guards that are placed over it to hold the stock in place while being coated. Fig. 6 is a side and a front view of the arms that raise the guards up from over the coated stock. Fig. 7 is a transverse section of the guard and dipping-trough, showing the guard and brushes in the trough. Fig. 8 is an end view of the guards, and Fig. 9 is a modified form of arms for elevating the guards.

Similar numerals and letters of reference refer to similar parts throughout the several views.

1 is the main supporting-frame, which may be made of any suitable material and is provided at one end with an upwardly-projecting frame 1', that supports the brush-frame 7, which is fitted to work freely up and down on the ways 43 and supports the brushes 25 to carry them to and from the dipping-trough 2. The brushes are provided with handles 8, that pass through the girths of the frame 7 and terminate above the frame with cranks 29, by means of which they are made to revolve through the medium of the pitman 9, driven by the shafts 11 and 12, the shaft 12 being driven by the bevel gear-wheels 17 and 18 or by any other suitable multiplying driving mechanism. The wheel 17 is supported upon a hollow shaft or sleeve 15, which is supported in the box 16 to revolve freely and is held up to place by a collar, as 60.

The upper end of the sleeve 15 is provided with a clutch, as 59, with which the pin 58 on the shaft 12 engages when the shaft and brush-frame are carried down to bring the brushes into the chocolate or dipping trough 2, so that the shaft 12 does not revolve except when in the direct act of coating the centers 6 with chocolate. The upper end of this shaft is supported in a box 13, and motion is transmitted from it to the shaft 11 by the sprocket-chain 26, so that the pitman 9 is always made to travel in the same parallel plane to give perfect action to the brush-cranks 29.

The brush-frame is made to travel to and from the dipping-trough by means of the cranks 61 through the medium of the pitmen 14 14, the upper ends of said pitmen being provided with slots 56, so that when the brush-frame is down and the brushes are revolving in the act of spreading the chocolate on the stock the frame may be allowed to stand idle while the cranks 61 are traveling through the lower portion of their circuit (indicated by the dotted lines $x\, x$ in Fig. 2) by means of the slots sliding down over the arms 28 28, thus allowing the brushes to make several revolutions while in the immediate act of coating the centers.

The centers to be coated are supported on a tray 4, preferably corrugated, as in Fig. 4, which in turn is attached to the steps 5 on the supports 23, which in turn are slidingly secured to the ways 43 43 and are held to place by spiral springs 24 24, so that the trays may be forced down into the chocolate by the hood 63 and up again to position by the spiral springs. I prefer that the steps 57 57 be chambered, so that when the springs are down they will pass entirely into the chambers, thus enabling me to use a mere open spring and at the same time to provide a perfectly firm bearing for the brush-frame when down. The hood 63 (shown in longitudinal section in Figs. 1 and 5 and in transverse section in Figs. 2, 3, and 7) is designed to entirely cover and surround the brushes, so that when the tray of stock is forced down on the shelf 3 in the dipping-trough the chocolate will be entirely cut off from flowing on the centers and the stock will be cooled by air forced from the blower 51 through the pipe 27 and the tubes 28 into the hoods.

To prevent the centers from floating in the chocolate or being displaced by the revolving of the brushes, I provide a series of wire guards 47, that may be placed over centers of stock when they are being immersed in the melted chocolate. These guards are detached from the machine, so that they may be readily removed and replaced in the process of coating the centers.

The shaft 19 is driven by the sprocket-chain 53 from the sprocket-wheel 22 to the sprocket-wheel 21, the shaft 20 being the main shaft of the machine and driven by a belt over the pulley 32.

To convey the coated stock to and from the chocolate-trough, I provide, first, a lever having arms 46, to which are pivoted slides 44 in position to press against the edges of the guards 47, and an arm 46 in position to be actuated by the pin P on the wheel 21 in one direction and by the spring 46' in the other direction and is timed to move the stock and guards under the hood when up and drop back as the hood starts down, and, second, connecting-rods 36, connected at the free end with a rod extending across from one to the other and terminating in the pins 65 to the end next to the brush-frame in position to be thrown over and back of the coated stock after it is forced from under the brush-frame and hood. To draw these rods back, I attach the back ends to the top of the levers 52, which levers are pivoted to the shaft 64 and are connected by the pitman 30 to the crank 31, so that the revolving of the crank will cause the levers to reciprocate and carry the rod 36 toward and from the coating-trays, as described. I provide for raising the free end of these rods by pivoting an incline 45 to the upright supports 37 in position so that the backward motion of the rod will allow the pin 65 to pass back under it, as indicated by the dotted lines in Fig. 3, and the reverse motion of the rod will cause the pin to travel up over it and raise the ends of the rods for the purpose hereinbefore described.

My appliance for carrying the coated stock back after it has been drawn off of the dripping-shelf 41 consists of an endless belt or carriage 39, supported at one end upon and driven by a drum upon the shaft 64, as indicated in Figs. 2 and 3, and at the other end upon a dummy or idler-pulley 66. The motion of the belt 39 is intermittent and is produced by the pawl 54 acting upon the ratchet 53 through the medium of the lever 52 and the pitman 30, operated by the crank 31, as hereinbefore described.

To cool the coated stock as it is carried from the dripping-shelf 41, I sometimes provide an ice-box 49, situated on top of the frame 1 and having a flue 67 beneath the ice 50, so arranged that the stock may pass through freely, as indicated in Fig. 1. This flue should extend out some distance at each end of the ice-box, as at 62, to combine with the wings 42 on the belt 39 to avert the danger of a current of warm air passing through, as follows: The wings 42 on the belt should be placed about the distance apart that the projection extends beyond the end of the box, so that the flue beneath the box proper will be closed at all times and warm air entirely shut out. The wings 42 are flexibly attached to the belt, so that they may bend over to pass by the end of the dripping-shelf 41, and to provide for carrying the belt far enough to pass the shelf I provide an auxiliary pawl and ratchet 35 and 33 on the opposite side of the machine so adjusted that they will throw the belt only when the wings are passing the shelf, and then just far enough to carry them past the shelf.

The hood 63 should be properly ventilated by openings, as $a$ in Fig. 1, so that a free circulation of air from the blower 51 through the pipe 27 will be insured when the centers are immersed in the melted chocolate in the dipping-trough while being coated with chocolate.

It is preferable that the air-pipe 27, leading from blower 51 to the hood 63, should pass through the ice-box, so that the air that circulates through the hood will be as cold as possible when it comes in contact and intermingles with the chocolate as it is being coated on the centers.

The guards 47 are composed of a series of wire cones connected in a continuous line, as in Figs. 1 and 5, and are placed over the centers 6 before it is carried under the hood 63 over the dipping-trough, where it is carried by the slides 44, impelled by the pin P on the crank-wheel 19, through the medium of the lever 46 38. To insure the carrying of each guard full of stock beyond the hood after it has been coated, I place projecting arms $b$ at each end, so that each succeeding guard will push the former one clear from under the hood and onward toward the transfer-belt 39. I place a wire $c$ (see Fig. 3) back of the dipping-trough 2 and over the dripping-shelf 41, at each end, in position to raise the guard 47 slightly up from the shelf and in position, so that the auxiliary elevator 67, when raised to the position indicated by the dotted lines, will raise the guard with it, as indicated, to a position where the fingers $h$ on the elevator-chain 75 will engage the guard and carry them up and over to the warming-shelf 76, which is heated by means of a gas-jet, as 77, or other suitable device, to a proper temperature to keep the guards free of chocolate that may remain on them after being dipped with the centers. The auxiliary elevator 69 is operated by the lever 68 and a cam 74. (Shown in outline back of the sprocket-wheel 22 on the shaft 20.)

I do not desire to restrict myself to the use of this particular style of elevator, as other forms may be successfully used, as, for instance, the well-known form shown in Fig. 9, in which I make use of the cross extensions 67', and throw the guard over by means of a latch $f$, the end of which is designed to come in contact with the cross-girth $g$ at the top of the frame 1', and to this latch may be pivoted a support $f'$ in position to be thrown up, as per dotted lines, and drop under the guards, which, however, is not necessary when the guards are carried beyond the dripping-shelf 41 and over the transfer-belt before they are elevated.

My appliance for controlling the thickness of the chocolate on the centers consists of a rod 69, secured at one end to the ends of the dripping-shelf 41 and extending thence down to the ratchet-wheel 71, with the intervention, if desired, of the pivoted support 70, so that the revolving of the ratchet-wheel will cause it to vibrate vertically rapidly when a thin coat is desired, slower when a medium coat is desired, and slowly when a thick coat is desired, the motion of the vibrations being arranged by the use of cone-pulleys, as shown at 72 and in outline at 73.

When desiring to ornament the stock, I use a guard having tubes $b^2$ attached, through which I pass a wire stem $b'$, so that it will adjust itself vertically to the height of the centers to be coated and form on the lower ends thereof ornamental or zigzag prongs $b^3$ in position to rest on the top of the centers, so that when the guard is raised up off of the coated stock the imprint of the wires will be left thereon. These ornamenting-wires may be arranged to drop to the centers by gravity, or they may be forced down by a spring, as desired. In Fig. 8 I have given this form of guard and have shown the ornamenting-wires at different heights to illustrate their adjustability. The centers to be coated are placed on the tray, when the brush-frame is up, and passed under the hood 63, so that the downward motion of the brush-frame and hood will immerse them in the chocolate in the trough 2. As the hood enters the trough the lug 58 on the shaft 12 engages with the lug 59 on the sleeve 15, causing the brushes 28 to revolve and agitate the chocolate as it flows over the centers in the trough, thus allowing the current of cold air from the blower 51 through the pipe 27 to intermingle freely between the body of chocolate in the hood and the centers being coated. This chocolate is cut off for the time being from the heated chocolate in the trough by the hood, so that intermingling of the air with the chocolate may be regulated to impart any desired color to the chocolate on the coated stock when cold, a result that I find it impossible, so far, to attain by any other means, and which I regulate by the velocity and temperature of the intermingling air. The chocolate in the trough 2 may be heated by a gas-jet 2' or other suitable device. With the upward stroke of the brush-frame the coated stock is raised from the dipping-trough to a level with the dripping-shelf 41, whence it is drawn back upon the transfer-belt 39, as hereinbefore described.

Having thus fully described my invention, what I claim as new, and desire to secure by Letters Patent of the United States, is—

1. In a chocolate-coating machine, a main frame supporting suitable driving mechanism, a vertical frame attached to said frame and provided with ways for the support of a vertically-reciprocating brush-frame, cranks and pitmen for reciprocating said frame, revolving brushes supported in said frame, a chocolate, or dipping trough beneath said brushes, a tray secured to vertically-reciprocatable slides for supporting the centers and conveying them to the melted chocolate in the trough, slides to force the centers to the tray and the coated stock from the tray to the dripping-shelf, a dripping-shelf, and a conveyer-belt, substantially as and for the purpose set forth.

2. In a chocolate-coating machine, a supporting-frame, a vertically-reciprocating brush-frame supported thereon, brushes supported upon shafts that pass through said brush-frame, cranks on the upper ends of said shafts, a pitman connecting said cranks and driven by cranks, one at each end of the frame, the shafts supporting said cranks connected by a sprocket chain and wheels so that the pitman must always travel in the same parallel plane, the driving-shaft supported at the lower end in a sleeve, a clutch at the upper end of said sleeve to engage with a pin in the shaft to drive the shaft intermittently, cranks and pitmen for reciprocating the brush-frame, a trough for holding melted chocolate, a tray secured to sliding supports to hold the centers when being fed to and from the chocolate, guards to hold the centers to place on the tray, a hood over the brushes to cover the centers while being coated, a blower, an air-pipe connecting said blower and hood, slides to convey the coated stock from under the brushes toward the conveyer-belt, a conveyer-belt, a ratchet-wheel, a pawl, a crank and pitman to operate the conveyer-belt, wings attached to the conveyer-belt to close the flue under the ice-box, an auxiliary pawl and ratchet for use when the wings are approaching the flue under the ice-box, and an ice-box situated above the conveyer-belt with a flue between, substantially as and for the purpose set forth.

3. In a chocolate-coating machine, a supporting-frame, a vertical frame attached thereto and fitted to support a vertically-reciprocating brush-frame, a brush-frame fitted to reciprocate vertically in said frame, a series of brushes supported in said brush-frame, said brushes having heads constructed to agitate the chocolate as it is being coated on the centers and supported on shafts that pass up through the brush-frame and terminate in cranks at their upper ends, a pitman fitted to revolve all of the brushes simultaneously, a crank at each end of the brush-frame for actuating said pitman and supported upon shafts that are connected by a sprocket chain and wheels, one of said shafts connected with a sleeve having a clutch fitted to drive the shaft, only, when the brush-frame is lowered, a hood covering the brush-heads, vents in said hood, a blower and pipe connected with the hood to force air through the hood, a dipping-trough below said brush, a tray secured to sliding supports at the top of the trough to be forced down by the hood that covers the brushes, springs for actuating said slides, a wire guard for holding the stock to place, slides for conducting the centers to the dipping-trough and the coated stock from it, a dripping-shelf, a standard and ratchet-wheels for vibrating said shelf, and an elevator to carry the guards from the dripping-shelf within convenient reach of the operator, substantially as and for the purpose set forth.

4. The combination in a chocolate-coating machine, of a supporting-frame, a dipping-trough on said frame, slides for conducting the centers to and the coated stock from the trough, with a guard and hood for covering the centers, a revoluble brush for agitating the chocolate over and around each individual center while being coated, and means for forcing cold air through the hood and commingling it with the agitated chocolate about the centers, substantially as and for the purpose set forth.

5. In a chocolate-coating machine, a supporting-frame, a vertically-reciprocating brush-frame supporting a series of revoluble brushes, a hood covering said brushes, a blower connected by pipe with said hood, a dipping-trough, vertically-reciprocating slides supporting a tray over said trough, a receiving and a dripping shelf connected with the trough, slides for conducting the centers from the receiving-shelf to the trough and the coated stock from the trough to the dripping-shelf, rods and ratchet-wheels arranged to vibrate said dripping-shelf, and cones by means of which the rapidity of said vibrations may be regulated, substantially as and for the purpose set forth.

6. In a chocolate-coating machine, a supporting-frame, a vertically-reciprocating brush-frame carrying a series of revoluble brushes, a dipping-trough, beneath said brush-frame, slides for conducting centers to said trough and the coated stock from it, guards to cover the centers while being coated, a dripping-shelf, and an elevator to carry the guards from the dripping-shelf to the warming-shelf, substantially as and for the purpose set forth.

7. In a chocolate-coating machine, a frame supporting the driving mechanism of the machine, a vertically-reciprocating brush-frame, cranks for actuating said brush-frame, a pitman connecting said cranks and the brush-frame, the upper ends of said pitman being slotted so that the brush-frame is stationary during a portion of the lower course of travel of the cranks, brushes supported in said frame arranged to revolve, only, when the frame is down and the brushes in the dipping-trough, a dipping-trough, a receiving-shelf, a dripping-shelf, and a conveyer-belt substantially as and for the purpose set forth.

8. In a chocolate-coating machine, a supporting-frame, a vertically-reciprocating brush-frame, intermittently-revoluble brushes in said frame, a dipping-trough, means for heating the chocolate in said trough, a warming-shelf convenient to the reach of the operator, guards to cover the centers when passing to and from the dipping-trough, a dripping-shelf back of the dipping-trough, an elevator for carrying the guards from the dripping-shelf to the warming-shelf and a conveyer-belt to carry the coated stock from the machine, substantially as and for the purpose set forth.

9. In a chocolate-coating machine, a supporting-frame, a dipping-trough on said frame, a vertically-reciprocating frame and tray for carrying the centers into and out of the trough, a hood for covering the tray and passing with it into the melted chocolate, and form an air-chamber through which air may be forced to intermingle with the chocolate when flowing around the centers in the dipping-trough, a guard to cover the stock within the hood, and a blower connected to force cold air through the hood, for the purpose of temperating the coated stock to produce the desired color substantially as and for the purpose set forth.

10. In a chocolate-coating machine, a longitudinal guard made of wire for securing the stock when being coated and a series of ornamenting devices suspended from the top of said guard, substantially as and for the purpose set forth.

11. In a chocolate-coating machine, a supporting-frame, a dipping-trough, and a hood for covering the stock; in combination with an appliance for forcing and mixing cold air into the chocolate when being coated upon the centers, substantially as set forth.

Signed at Grand Rapids, Michigan, December 10, 1895.

PETER J. VANDER LINDA.

In presence of—
ITHIEL J. CILLEY,
CHARLES W. DAVIDSON.